(12) United States Patent
Talluri (10) Patent No.: US 7,178,097 B1
(45) Date of Patent: Feb. 13, 2007

(54) METHOD AND SYSTEM FOR USING A COMMUNICATIONS NETWORK TO ARCHIVE AND RETRIEVE BIBLIOGRAPHY INFORMATION AND REFERENCE MATERIAL

(76) Inventor: Srikrishna Talluri, 23730 Pond Rd. Apt. #121, Southfield, MI (US) 48034

( * ) Notice: Subject to any disclaimer, the term of this patent is extended or adjusted under 35 U.S.C. 154(b) by 1091 days.

(21) Appl. No.: 09/711,791

(22) Filed: Nov. 13, 2000

(51) Int. Cl.
*G06F 15/00* (2006.01)

(52) U.S. Cl. .................. 715/501; 715/511; 715/740; 705/7

(58) Field of Classification Search ............ 715/501.1, 715/522, 526, 501, 511; 707/4, 5, 10, 200, 707/201, 204; 345/805; 705/26, 27, 104; 709/201, 203, 217, 219; 514/4; 434/169
See application file for complete search history.

(56) References Cited

U.S. PATENT DOCUMENTS

| | | | |
|---|---|---|---|
| 5,367,621 A * | 11/1994 | Cohen et al. | ............ 715/501.1 |
| 5,530,899 A | 6/1996 | MacDonald | |
| 5,557,790 A | 9/1996 | Bingham et al. | |
| 5,727,156 A | 3/1998 | Herr-Hoyman et al. | |
| 5,870,552 A | 2/1999 | Dozier et al. | |
| 5,870,770 A | 2/1999 | Wolfe | |
| 5,873,107 A | 2/1999 | Borovoy et al. | |
| 5,941,944 A | 8/1999 | Messerly | |
| 5,970,505 A * | 10/1999 | Ebrahim | ............ 715/501.1 |
| 5,983,214 A | 11/1999 | Lang et al. | |
| 5,983,267 A | 11/1999 | Shklar et al. | |
| 5,987,454 A * | 11/1999 | Hobbs | ............ 707/4 |
| 6,009,442 A | 12/1999 | Chen et al. | |
| 6,460,036 B1 * | 10/2002 | Herz | ............ 707/10 |
| 6,625,624 B1 * | 9/2003 | Chen et al. | ............ 707/204 |

(Continued)

OTHER PUBLICATIONS

U.S. Appl. No. 60/243,259.*

(Continued)

*Primary Examiner*—William Bashore
*Assistant Examiner*—Quoc A. Tran
(74) *Attorney, Agent, or Firm*—Brooks Kushman P.C.

(57) ABSTRACT

A method and system for using a communications network such as the Internet to archive and retrieve bibliography information and reference material cited in a manuscript includes a first communications device connected to the Internet for an author of a manuscript to use. The author uses the first communications device to transfer identification of reference material cited by the author in the manuscript to the Internet. A second communications device is connected to the Internet for an audience of the manuscript to use. The audience uses the second communications device to request and receive a copy of the reference material cited by the author in the manuscript from the Internet. A database is connected to the Internet to communicate with the author and the audience via the Internet. The database receives the identification of reference material cited by the author from the author. The database stores a copy of the reference material and a distinctive key associated with the copy of the reference material. The database transmits a copy of the reference material to the audience in response to receiving a request from the audience for a copy of the reference material. The reference material cited by the author in the manuscript may be a website, an e-mail, a digital file, and traditional media such as a paper book or magazine.

28 Claims, 3 Drawing Sheets

U.S. PATENT DOCUMENTS

| | | |
|---|---|---|
| 6,725,203 B1 * | 4/2004 | Seet et al. .................... 705/14 |
| 2002/0013828 A1 * | 1/2002 | Kashiwabara et al. ...... 709/219 |
| 2002/0120648 A1 * | 8/2002 | Ball et al. ................... 707/511 |
| 2002/0152215 A1 * | 10/2002 | Clark et al. ................... 707/10 |
| 2005/0108626 A1 * | 5/2005 | Ong ........................... 715/511 |

OTHER PUBLICATIONS http://web.archive.org/19991008184803/chronicle.com/about-help.dir/atinfo.htm pp. 6.*

* cited by examiner

REFERENCES ─ 70

1) www.WebSite Channel.com, accessed September 2000, last modified August 2000, Key = WebSite Channel Al. ← 72

2) www. Internet Source Info.com, accessed May 2000, last modified January 2000, Key = Internet Source Info B3.

3) Engines, Heywood, pp 01-101, 1998, Key = Engines - Heywood. ← 74

4) Krish email, October 4, 2000, Key = Krish email Oct 4, 2000.

5) Engine Seminar Audio Conference, Detroit July 2000, Key = Engine Seminar Audio Conference - Detroit, 2000.

6) Krish letter to Heywood, October 1, 2000, Key = Krish Letter to Heywood.

FIG. 5

METHOD AND SYSTEM FOR USING A COMMUNICATIONS NETWORK TO ARCHIVE AND RETRIEVE BIBLIOGRAPHY INFORMATION AND REFERENCE MATERIAL

TECHNICAL FIELD

The present invention relates generally to publishing and, more particularly, to a method and system for using a communications network such as the Internet to archive and retrieve bibliography information and reference material cited in a manuscript.

BACKGROUND ART

Authors of manuscripts and documents such as books and research papers frequently cite material such as articles and other books in a bibliography section. The bibliography section is usually attached to the end of the manuscript. (The terms "Works Cited" and "References" mean the same. Each is a list of works that have been cited by an author, or works to which an author has made a reference. However, the term "Bibliography" stands for a list of all the material an author has consulted in preparing a manuscript irrespective of whether or not it has been cited.) Herein, the term "Bibliography" also represents the terms "Works Cited" and "References".

The entire manuscript including the bibliography section is then copied for distribution to an audience. The author uses the cited reference material as a source of information for writing the manuscript. Traditionally, the reference material has been limited to physical media such as other books, research papers, newspaper and magazine articles, and the like. Occasionally, personal communications (regular mail), works-in-progress (interim reports, confidential reports), are also cited by authors of manuscripts.

However, information available on websites on the World Wide Web, e.g, the Internet, has become an indispensable source for research on several areas of interest and often makes a study more comprehensive. Information can be retrieved instantly from the Internet at any time from any location and may incorporate the most current news. Web based information is not merely an electronic version of a physical publication (such as newspapers and magazines) but is rather a standalone medium with no physical equivalents or limitations (i.e., page size).

Authors and researchers are now starting to cite information from websites in their manuscripts. Various professional bodies have issued protocols for citing web content. In the bibliography section, authors generally include three pieces of information when citing web content. The first piece of information is the address of the website such as a Uniform Resource Locator (URL), for instance, www.website.com. The second piece of information is the date of access of the website (by the author) and the third piece of information is the last modified date of the website.

A problem with citing websites as sources of information is that 1) websites are subject to frequent, invisible modifications and 2) may be moved to a new address or removed from the Internet without notice. Moreover, material from a website once accessible to everyone may now be limited to a select audience. Even hypertext essays (published on the Internet itself) now often contain a list of other websites used in that study.

An important reason for citing references from any source including the Internet and traditional published material is to enable verification of the material used from the references. The bibliography section of a manuscript also becomes a resource of information for other researchers in that field. Referees of research papers, editors, other researchers and the audience of the manuscript need to review/verify the information taken from the cited references. Traditionally, the bibliography information is either given in alphabetical order or the order in which the material was used in the manuscript, with a description of the journal or magazine from which it was taken (source), title of the particular essay, editor or author name, volume number of the journal or magazine, date of publication, and particular pages where the content was assimilated. Such information enabled easy review/verification of the bibliography information or reference material.

The problem with citing a website is that the fluid, ever modifiable potential of the content of the website does not guarantee availability and true verification of the material actually used by the author.

Further, information given out by interacting members of news groups (another Internet source) and through personal communication methods such as e-mails that are cited by an author as references cannot be verified by a third party unless the information is reproduced verbatim by the author in the content of the manuscript or in the bibliography section. Authors may also cite works in progress (such as unpublished interim reports) and information obtained through personal communication methods such as regular mail. However, the problem of the inability to review/verify such material also ails these sources.

While traditional publishers generally act as authenticators for the material printed and circulated by them there exists no credibility checking service or protocol for information available over the Internet. Search engines used for selecting websites by keywords give worthy, mediocre, and worthless websites equal importance. So, while it can be considered safe to look up and use content published in a magazine or journal, which are thus authenticated, it might be risky to use content from most web sites (that don't have any means of authentication) in a manuscript.

As such, in light of the affect the cited web based material might have had on a given manuscript, it becomes important for referees, editors, other researchers, and the audience of the manuscript to ascertain the credibility of the cited information available on those Internet websites (sources). The same can be said of hitherto non-verifiable sources such as interim reports, e-mails, communication on newsgroups/userforums, personal communications (regular mail) and the like.

SUMMARY OF THE INVENTION

Accordingly, it is an object of the present invention to provide a method and system for using a communications network to archive and retrieve bibliography information and reference material cited in a manuscript.

It is another object of the present invention to provide a method and system for using a communications network to archive and retrieve bibliography information and reference material from an Internet source such as a website cited in a manuscript.

It is a further object of the present invention to provide a method and system for using a communications network to archive a copy of information from an Internet source cited in a manuscript.

It is still another object of the present invention to provide a method and system for using a communications network to archive a copy of information from an Internet source cited in a manuscript for retrieval by users of the manuscript to enable verification of the cited Internet source information.

It is still a further object of the present invention to provide a method and system for using a communications network to archive and retrieve bibliography information and reference material from personal communications such as e-mails and regular mail cited in a manuscript.

It is still yet another object of the present invention to provide a method and system for using a communications network to archive and retrieve bibliography information and reference material from a digital medium such as audio digital files, video digital files, and graphics digital files cited in a manuscript.

It is still yet a further object of the present invention to provide a method and system for using a communications network to archive and retrieve bibliography information and reference material from traditional physical sources of information such as books and magazines, interim reports, and works-in-progress cited in a manuscript.

In carrying out the above objects and other objects, the present invention provides a system for archiving reference material in a bibliography of a manuscript using a communications network such as the Internet. The system includes a first communications device connected to the communications network for an author of a manuscript to use. The author uses the first communications device to transfer identification of reference material cited by the author in the manuscript to the communications network. A second communications device is connected to the communications network for an audience of the manuscript to use. The audience uses the second communications device to request and receive a copy of the reference material cited by the author in the manuscript from the communications network.

A database is connected to the communications network to communicate with the author and the audience via the communications network. The database receives the identification of reference material cited by the author from the author. The database stores a copy of the reference material and a distinctive key associated with the copy of the reference material. The database transmits a copy of the reference material to the audience in response to receiving a request from the audience for a copy of the reference material.

The database may transmit the distinctive key associated with the copy of the reference material to the author. In response, the author cites the distinctive key associated with the copy of the reference material in the manuscript. The audience then obtains the distinctive key from the manuscript and then transmits a request having the distinctive key to the database. The database transmits a copy of the reference material to the audience in response to receiving the request having the distinctive key.

The reference material cited by the author in the manuscript may be a website, an e-mail, a digital file, traditional media such as a paper book or magazine, an interim report, and the like. If the reference material is a website the database receives a copy of the website from the Internet for storage and then transmits a copy of the website to the audience in response to receiving the request from the audience for a copy of the website. If the reference material is an e-mail the database receives a copy of the e-mail from the author via the Internet for storage and then transmits a copy of the e-mail to the audience in response to receiving the request from the audience for a copy of the e-mail. If the reference material is stored as a digital file the database receives a copy of the digital file from the author via the Internet for storage and then transmits a copy of the digital file to the audience in response to receiving a request from the audience for a copy of the e-mail. If the reference material is a paper book, photograph, an interim report, or the like the database receives an electronic scanned copy of the paper book/reference material from the author via the Internet for storage and then transmits an electronic copy of the paper book/reference material to the audience in response to receiving a request from the audience for an electronic copy of the paper book/reference material.

In carrying out the above objects and other objects, the present invention further provides a method for archiving reference material in a bibliography of a manuscript using a communications network such as the Internet, a first communications device connected to the communications network for an author of a manuscript to use, a second communications device connected to the communicates network for an audience of the manuscript to use, and a database connected to the communications network to communicate with the author and the audience via the communications network.

The method includes transmitting identification of reference material cited by the author in the manuscript to the communications network from the first communications device. The identification of the reference material cited by the author is then received at the database. A distinctive key is then associated with the reference material cited by the author. A copy of the reference material cited by the author and the associated distinctive key are then stored at the database. A request for a copy of the reference material is then transmitted from the audience to the database using the second communications device. A copy of the reference material is then transmitted from the database to the audience in response to the database receiving the request for a copy of the reference material from the audience. The distinctive key associated with the copy of the reference material is given by the database to the author. The distinctive key associated with the copy of the reference material may then be cited in the manuscript by the author. The distinctive key is then obtained from the manuscript by the audience. The transmitted request to the database may then include the distinctive key.

The advantages associated with the method and system of the present invention are numerous. The method and system of the present invention advantageously fill the deficiency associated with conventional bibliographic processes by identifying traditionally non-verifiable reference material cited in a manuscript with a distinctive key and then archiving a copy of the reference material on a database connected to a communications network such as the Internet. The audience of the manuscript may then access the reference material from the database by using the distinctive key for review and verification of the reference material. As a result, the method and system of the present invention protect the cited information from continuous modification and removal of the reference material by providing an avenue for the audience to gain access to an exact copy of the reference material cited by the author of the manuscript. Further, the method and system of the present invention provide a means of verification of the reference material.

The above objects and other objects, features, and advantages of the present invention are readily apparent from the following detailed description of the best mode for carrying out the present invention when taken in connection with the accompanying drawings.

BEST MODES FOR CARRYING OUT THE INVENTION

In general, the present invention is a method and system or using a communications network such as the Internet, wired and wireless data communications networks, and the like to archive and retrieve bibliography information and reference material cited in a manuscript. In operation, an author cites material from an information source such as an Internet source in the manuscript and then adds information identifying the Internet source into the bibliography section of the manuscript. The reference material from the Internet source may be from a website. The Internet source identification information may include the address of the website, i.e., the uniform resource locator (URL), the date of access of the website by the author, and the last modified date of the website. The website identification information is then transferred to the Internet for storage on a database associated with the manuscript. In addition to the website identification information, a copy of the website information is also transferred to the Internet for storage on the database. The database assigns a permanent distinctive key (other than the URL identifying the website) to the website identification information and the copy of the website. The distinctive key can then be used by readers of the manuscript to gain access to the website information cited by the author of the manuscript as the website stood on the date of submission by the author to the database.

The database acts as the bibliography of the manuscript by including a listing of information for each website cited in the manuscript. However, the database is more than a bibliography in that a copy in verbatim of each website used by the author is also stored on the database. In effect, the database archives the reference material for subsequent retrieval. Accordingly, if the website is modified or removed from the Internet after the date of access by the author or after the manuscript is distributed to an audience, the audience may access the database to retrieve the actual website information used by the author for review and verification.

Additionally, the method and system of the present invention extend to the identification and archival of other reference material such as works-in-progress, e-mails, regular mail, digital files, and traditional physical media by assigning a distinctive key to a copy of each such material and storing the distinctive key and the copy in the database for subsequent retrieval from the database.

Figure 1:
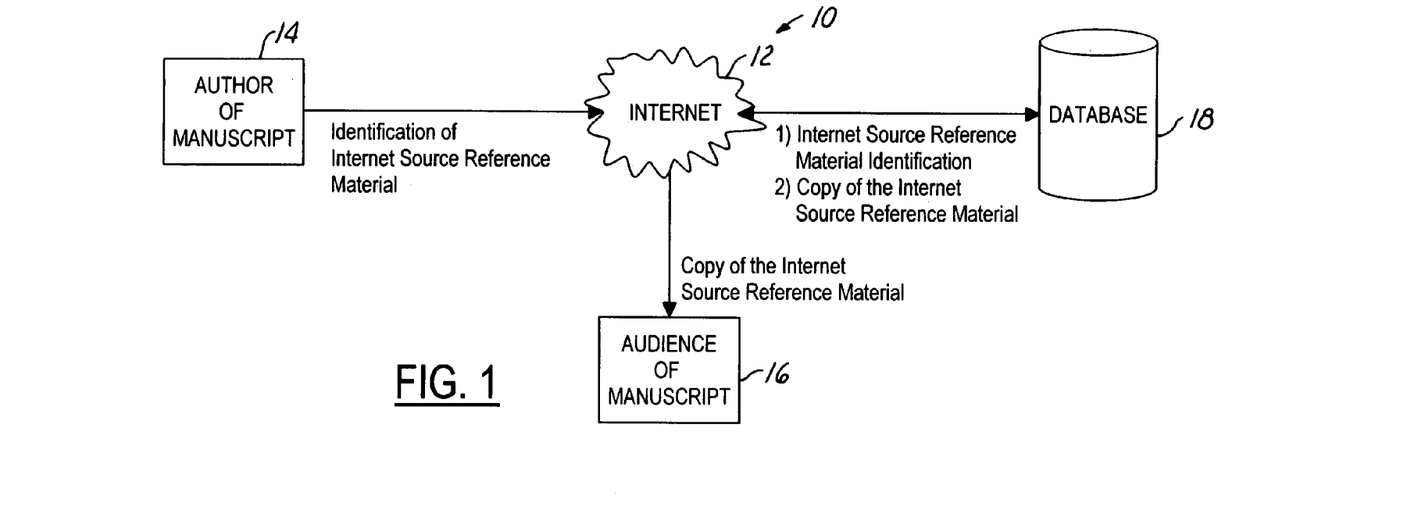
FIG. 1 illustrates a block diagram of a system in accordance with the present invention.

Referring now to FIG. 1, a block diagram of a system 10 for use with the present invention is shown. System 10 includes a communications network such as the Internet 12. An author 14 of a manuscript or document and an audience 16 of the manuscript are connected with the Internet 12 for transferring and receiving information from the Internet. A database 18 is also connected to Internet 12 for transferring and receiving information from the Internet. Author 14 uses the Internet 12 to cite reference material from Internet sources in the manuscript. The Internet sources may be websites on the Internet 12. Author 14 includes a bibliography section with the manuscript for listing the identification of the reference materials from the Internet sources and other sources. The bibliography section is intended to be reviewed by audience 16 for reviewing and verifying the reference material cited by author 14 in the manuscript. It is noted that the manuscript may be published or remain unpublished.

When citing a website as reference material in the manuscript, author 14 cites information identifying the website in the bibliography section of the manuscript. The identification information of the website in the bibliography section includes the address of the website such as a URL, the date of access of the website by the author, and the last modified date of the website. Author 14 then transfers to the Internet 12 information identifying the website as shown in FIG. 1. The website identification information transferred to the Internet 12 includes the address of the website. In response to author 14 transferring the website identification information to the Internet 12, database 18 receives from the Internet the website identification information and a copy of the reference material of the website, i.e., a copy of the website. The copy of the website is verbatim to the website on the Internet 12 when author 14 transferred the website identification information to the Internet. Database 18 then stores or archives the website identification information with the copy of the website.

Database 18 assigns a permanent distinctive key (other than the URL identifying the website) to the website identification information and the copy of the website. Author 14 includes the distinctive key in the bibliography section with the website identification information. Audience 16 of the manuscript may then access the Internet 12 to retrieve the copy of the website cited in the manuscript and in the bibliography section. In response to a request by audience 16 to the Internet 12 for access to the copy of the website, database 18 transfers the archived copy of the website to the audience via the Internet. As part of the request, audience 16 transfers the distinctive key provided by author 14 in the bibliography section of the manuscript to database 18 via the Internet 12. Database 18 uses the distinctive key to understand what reference material audience 16 is requesting. Audience 16 can then review the reference material from the website cited in the manuscript by author 14 for verification. The copy of the website provided by database 18 to audience 16 is an exact copy of the website when author 14 cited the website in the manuscript and submitted to database 18.

In effect, database 18 acts as a partial bibliography of the manuscript by including a listing of information for each website cited in the manuscript, and further includes a copy in verbatim of each website used by author 14. Database 18 archives the website for subsequent retrieval such that if the website is modified or removed from the Internet 12 subsequent to the author citing the website audience 16 may access the database to retrieve the actual website used by the author for review and verification.

Figure 2:
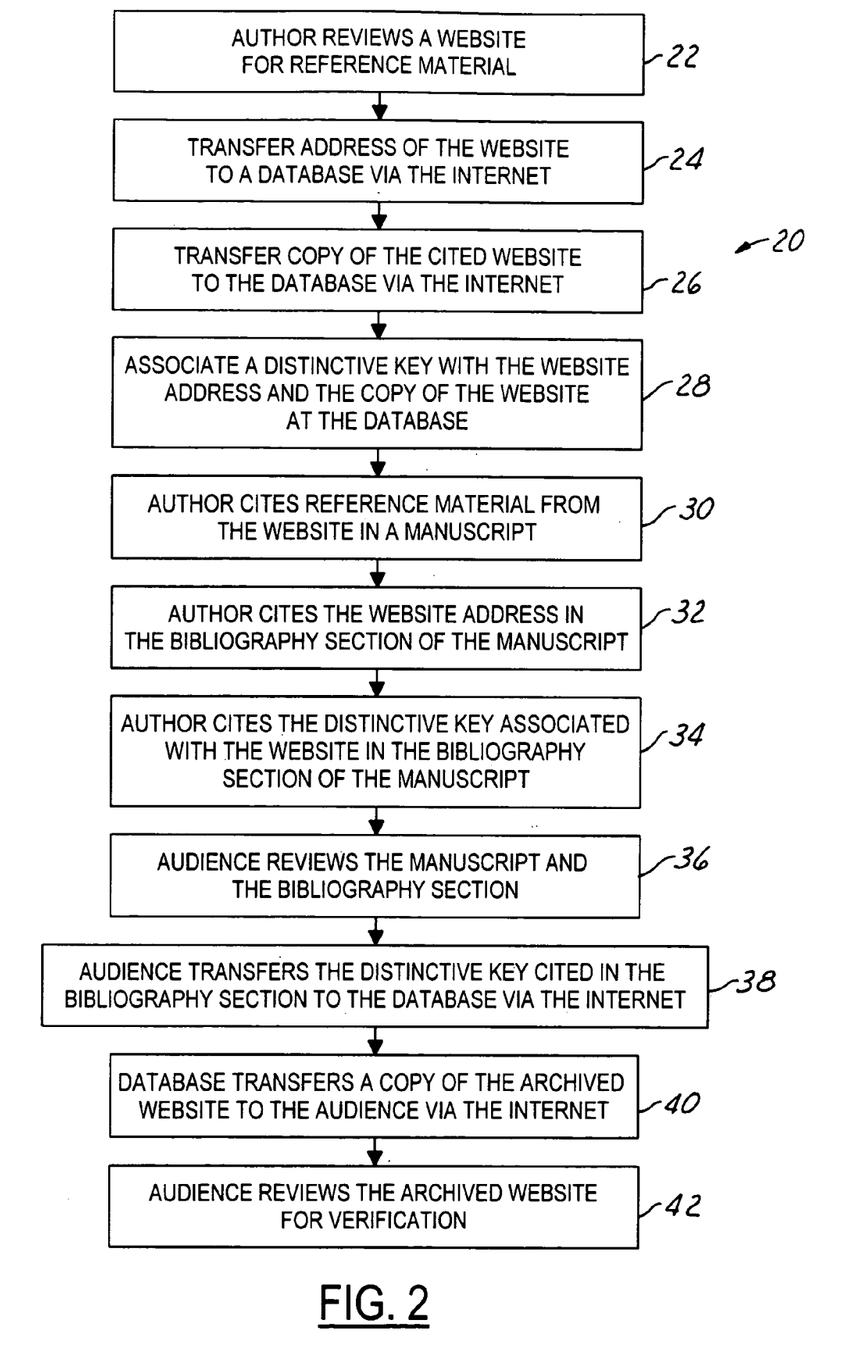
FIG. 2 illustrates a flow chart describing operation of the method and system of the present invention.

Referring now to FIG. 2, a flow chart 20 describing operation of the method and system of the present invention is shown. Flow chart 20 begins with author 14 reviewing a website on the Internet 12 for reference material as shown in block 22. Upon finding reference material of interest, author 14 transfers the website address to database 18 via the Internet 12 as shown in block 24. A copy of the website referenced by author 14 is then also transferred to database 18 via the Internet 12 as shown in block 26. This copy may be sent from the Internet 12 to database 18 in response to a request for such copy by the database. Database 18 stores and archives the website address and the copy of the website for subsequent retrieval. Database 18 archives this information because either the website address or the website itself may possibly be removed or altered after being cited by author 14. By archiving this information database 18 ensures that a verbatim copy of the website as cited by author 14 may be accessible for later study and verification. As part of the archiving process, database 18 associates a distinctive key (other than the URL) with the website address and the copy of the website as shown in block 28.

Author 14 then cites the reference material from the website in a manuscript being written by the author as shown in block 30. Author 14 then cites the address of the website such as the website URL in the bibliography section of the manuscript as shown in block 32. Author 14 may also cite in the bibliography section the date of access of the website and the last modified date of the website.

Author 14 then cites the distinctive key associated with the website in the bibliography section of the manuscript as shown in block 34. After distribution of the manuscript to audience 16, the audience reviews the manuscript and the bibliography section of the manuscript as shown in block 36. In order to verify the reference material of a website cited by author 14 in the manuscript, audience transfers a request along with the distinctive key cited in the bibliography section to database 18 via the Internet 12 as shown in block 38. In response to receiving the request and the distinctive key from audience 16, database 18 transfers a copy of the archived website along with the website address to the audience via the Internet 12 as shown in block 40. Audience 16 then reviews the archived website for verification of the reference material cited by author 14 in the manuscript as shown in block 42.

In addition to obtaining a copy of the archived website from database 18 over the Internet 12, audience 16 may directly obtain a copy of the archived website from database 18 using traditional communications means such as regular post mail, courier, facsimile, and the like. Further, if the manuscript is a hypertext document audience 16 may click a hypertext distinctive key link located in the hypertext document. The hypertext distinctive key link is associated with the archived reference material. Upon audience 16 clicking the hypertext distinctive key link database 18 transfers a copy of the archived reference material to the audience via the Internet 12.

Figure 3:
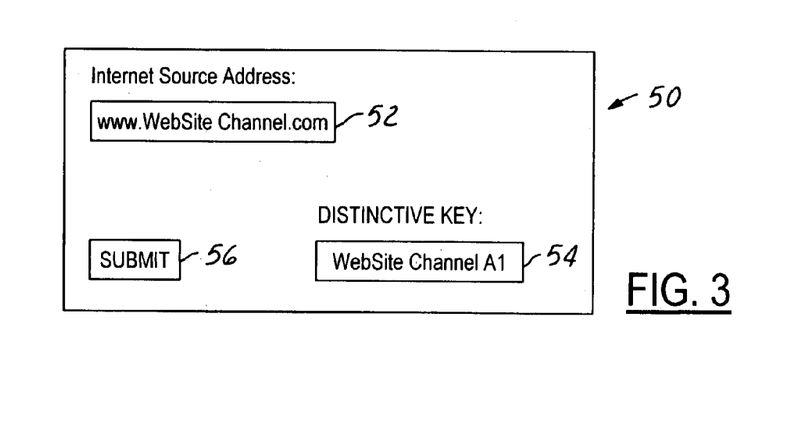
FIG. 3 illustrates a graphical user interface for use by the author of a manuscript to transfer the address of a website cited in the manuscript to the database of the system shown in FIG. 1.

Referring now to FIG. 3, a graphical user interface 50 for use by author 14 to transfer the address of a cited website to database 18 is shown. Graphical user interface 50 is part of a communications system enabling communication between author 14 and database 18 via the Internet 12. Graphical user interface 50 includes an Internet source address entry 52 and a distinctive key entry 54. Author 14 enters the address of a cited website in Internet source address entry 52. For instance, the address is "www.WebSiteChannel.com" as shown in FIG. 3. Author 14 then enters a distinctive key to be associated with the cited website in distinctive key entry 54. For instance, distinctive key is "WebSiteChannelA1" as shown in FIG. 3. (Alternatively, the distinctive key may be assigned by database 18 and then given by the database to author 14 as described above.) Upon entering the required information, author 14 presses a submit button 56 to transfer the entered information to database 18 via the Internet 12. Database 18 then accesses the Internet 12 to receive a copy of the website at the time of submission of the entered information by author 14. Database 18 archives the entered information, i.e., the website address and the distinctive key, with the copy of the website.

Figure 4:
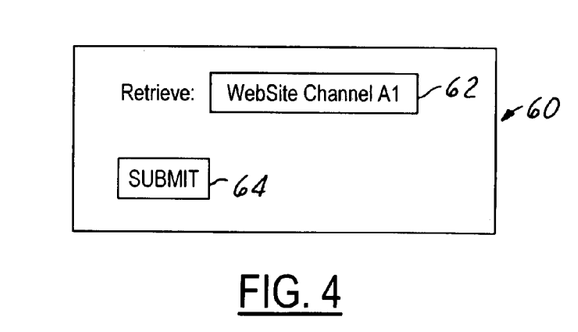
FIG. 4 illustrates a graphical user interface for use by the audience to receive a copy of a website cited in a manuscript from the database of the system shown in FIG. 1.

Referring now to FIG. 4, a graphical user interface 60 for use by audience 16 to receive a copy of the cited website from database 18 is shown. Graphical user interface 60 is part of a communications system enabling communication between audience 16 and database 18 via the Internet 12. Graphical user interface 60 includes an Internet source retrieve entry 62. Audience 16 enters the distinctive key associated with the cited website in Internet source retrieve entry 62. Upon entering the requested distinctive key information, audience 16 presses a submit button 64 to request database 18 via the Internet 12 to provide the audience with a copy of the cited website. In response to the request, database 18 transfers a copy of the cited website to audience 16 via the Internet 12. Audience 16 may then study and verify the cited website with the manuscript.

In addition to archiving website information, database 18 is further operable for archiving copies of other reference materials cited in a manuscript such as works-in-progress, e-mails, regular mail, digital files such as audio files, video files, and graphics files, and traditional physical media such as paper books and magazines. For example, the reference material cited by author 14 in a manuscript is an e-mail. In this case, author 14 transfers a copy of the cited e-mail to database 18 via the Internet 12. In response to receiving the e-mail copy database 18 associates a distinctive key with the e-mail copy and then stores the distinctive key with the e-mail copy. Author 14 then cites the e-mail with the distinctive key in the bibliography section of the manuscript. In reviewing the manuscript, audience 16 then transfers the distinctive key to database 18 via the Internet for requesting a copy of the cited e-mail for verification. Database 18 then transfers the e-mail copy to audience 16 in response to the request from the audience. Audience 16 may then review the e-mail copy for verification.

As can be readily understood, the reference material may be any type of material that can be stored by database 18. For example, any digital file can be stored by database 18. Similarly, traditional physical media such as paper books can also be stored in database 18 by scanning a portion or the entire paper book into a digital file. Further, audio/video files such as "ON24" news clips currently on the Internet may also be stored by database 18.

Further, the method and system of the present invention are useful with reference material that are kept in secrecy for a period of time. For example, reference material may be restricted from being distributed to audience 16 for a period of time. The reference material may be a completed manuscript having some sort of secrecy order or may be a partially finished manuscript that author 14 does not wish audience 16 to see until completed. Author 14 transfers the completed or partially finished reference material and information of when the reference material will be available to audience 16 to database 18. Database 18 stores and associates a distinctive key with the reference material and the reference material availability information. Audience 18 may then use the distinctive key to access database 18 for the reference material to review and verify. In response, database 18 transfers the reference material availability information to audience 16. If the reference material is not yet available to audience 16, the reference material availability information may say that the reference material will be available in the future and request the audience to check back at the appropriate time. Upon the expiration of the time period and after author 14 has transferred a completed reference material to database 18, the database transfers to audience 16 upon request a copy of the reference material stored on the database.

Figure 5:
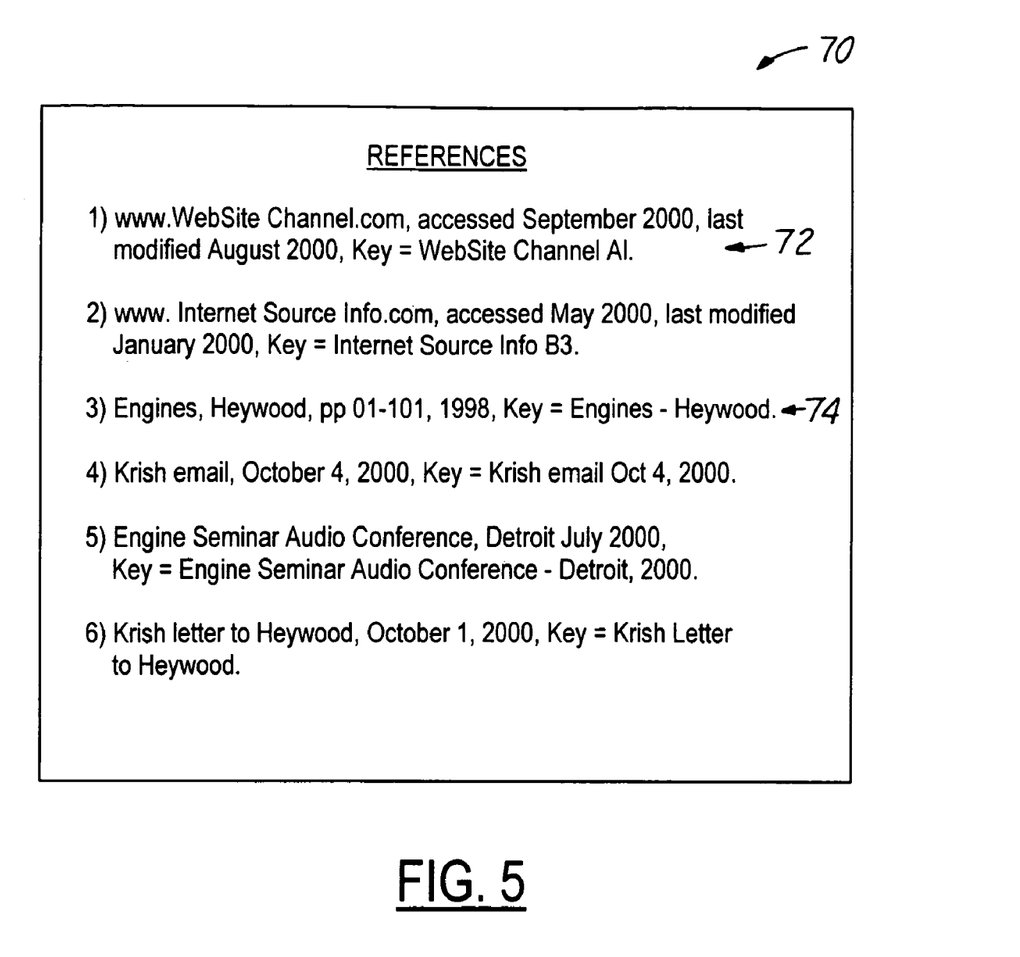
FIG. 5 illustrates an example of a bibliography section in accordance with the method and system of the present invention.

Referring now to FIG. 5, an example of a bibliography section 70 in accordance with the method and system of the present invention is shown. Bibliography section 70 is attached to an end of a manuscript written by author 14. Author 14 uses bibliography section 70 to list all of the references that were cited in the manuscript. For instance, bibliography section 70 includes an website reference 72 (bibliography reference #1) having the address "www.WebSiteChannel.com" and the associated distinctive key "WebSiteChannelA1" as shown in FIG. 5. Bibliographic reference #2 is also a website. Similarly, bibliography section 70 includes a paper book reference 74 entitled "Engines" and authored by Heywood. Paper book reference 74 includes the distinctive key "Engines-Heywood" as shown in FIG. 5. Bibliography references #4, #5, and #6 are e-mail, digital audio file, and regular mail references.

Thus it is apparent that there has been provided, in accordance with the present invention, a method and system for using the Internet to archive and retrieve bibliography information and reference material cited in a manuscript that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A system for archiving reference material cited in a bibliography of a manuscript by an author of the manuscript, the system comprising:
   a database connected to the Internet;
   a first communications device connected to the Internet, wherein an author of a manuscript uses a web site on the Internet as a reference for the manuscript, wherein the author uses the first communications device to transmit the addresses of the web site to the database;
   wherein the database obtains a copy of the web site from the Internet upon receiving the web site address from the author such that the copy of the web site obtained by the database is verbatim to the web site as on the Internet at the time the author transmitted the web site address to the database, wherein the database stores the copy of the web site along with a distinctive key associated with the copy of the web site;
   wherein the author cites the web site as being a reference for the manuscript by listing identification of the web site along with the distinctive key in the bibliography of the manuscript, wherein an audience of the manuscript obtains the distinctive key from the bibliography of the manuscript; and
   a second communications device connected to the Internet, wherein the audience uses the second communications device to transmit the distinctive key to the database in order to request the database for the copy of the web site;
   wherein the database transmits a copy of the stored copy of the web site to the audience via the Internet and the second communications device in response to receiving the distinctive key from the audience such that the copy of the web site received by the audience is verbatim to the web site as on the Internet at the time the author transferred the web site address to the database.

2. The system of claim 1 wherein:
   the stored copy of the web site in the database is immutable.

3. The system of claim 1 wherein:
   the database associates the distinctive key with the copy of the web site upon receiving the copy of the web site from the Internet and transmits the distinctive key to the author via the Internet and the first communications device.

4. The system of claim 1 wherein:
   the database stores the web site address along with the copy of the web site and the distinctive key.

5. The system of claim 1 wherein:
   the author uses an e-mail as a reference for the manuscript, wherein the author transmits a copy of the e-mail to the database using the first communications device for storage of the copy of the e-mail by the database;
   wherein the database transmits a copy of the e-mail to the audience via the Internet and the second communications device in response to receiving a request from the audience for a copy of the e-mail.

6. The system of claim 1 wherein:
   the author uses a digital file as a reference for the manuscript, wherein the author transmits a copy of the digital file to the database using the first communications device for storage of the copy of the digital file by the database;
   wherein the database transmits a copy of the digital file to the audience via the Internet and the second communications device in response to receiving a request from the audience for a copy of the digital file.

7. The system of claim 1 wherein:
   the author uses a paper book as a reference for the manuscript, wherein the author transmits an electronic scanned copy of the paper book to the database using the first communications device for storage of the electronic scanned copy by the database;
   wherein the database transmits an electronic copy of the paper book to the audience via the Internet and the second communications device in response to receiving a request from the audience for an electronic copy of the paper book.

8. A method for archiving reference material cited in a bibliography of a manuscript by an author of the manuscript, the method comprising:
   an author of a manuscript using a web site on the Internet as a reference for the manuscript;
   the author transmitting the address of the webs site to a database connected to the Internet using a first communications device connected to the Internet;
   the database obtaining a copy of the web site from the Internet upon receiving the web site address from the author such that the copy of the web site obtained by the database is verbatim to the web site as on the Internet at the time the author transmitted the web site address to the database;
   associating a distinctive key to the copy of the web site;
   storing at the database the copy of the web site with the distinctive key;
   the author citing the web site as being a reference for the manuscript by listing identification of the web site along with the distinctive key in the bibliography of the manuscript;

an audience of the manuscript obtaining the distinctive key from the bibliography of the manuscript;

the audience transmitting the distinctive key to the database using a second communications device connected to the Internet in order to request the database for the copy of the web site; and the database transmitting a copy of the stored copy of the web site to the audience via the Internet and the second communications device in response to the database receiving the distinctive key from the audience such that the copy of the web site transmitted from the database to the audience is verbatim to the web site as on the Internet at the time the author transmitted the web site address to the database.

9. The method of claim 8 wherein:

the stored copy of the web site in the database is immutable.

10. The method of claim 8 further comprising:

associating the distinctive key with the copy of the web site is done by the database;

the method further comprising transmitting the distinctive key from the database to the author via the Internet and the first communications device.

11. The method of claim 8 wherein:

storing at the database a copy of the web site with the distinctive key includes storing the web site address along with the copy of the web site and the distinctive key.

12. The method of claim 11 wherein associating the distinctive key to the copy of the web site further comprises:

the database transferring the distinctive key to the author via the Internet and the first communications device for the author to list in the bibliography of the manuscript.

13. The method of claim 8 wherein:

associating the distinctive key to the copy of the web site is done by the author;

the method further comprising the author transmitting the distinctive key to the database using the first communications device.

14. The method of claim 8 further comprising:

the author using an e-mail as a reference for the manuscript;

the author transmitting a copy of the e-mail to the database using the first communications device for storage of the copy of the e-mail by the database; and the database transmitting a copy of the e-mail to the audience via the Internet and the second communications device in response to the database receiving a request for a copy of the e-mail from the audience.

15. The method of claim 8 further comprising:

the author using a digital file as a reference for the manuscript;

the author transmitting a copy of the digital file to the database using the first communications device for the storage of the copy of the digital file by the database; and the database transmitting a copy of the digital file to the audience via the Internet and the second communications device in response to the database receiving the request for a copy of the digital file from the audience.

16. The method of claim 8 further comprising:

the author using a paper book as a reference for the manuscript;

the author transmitting an electronic scanned copy of the paper book to the database using the first communications device for storage of the electronic scanned copy by the database; and the database transmitting a copy of the electronic scanned copy of the paper book to the audience via the Internet and the second communications device in response to the database receiving a request for a copy of the electronic scanned copy of the paper book from the audience.

17. A system for storing a reference material using a communications network, the system comprising:

a first communications device connected to the communications network for an author of a manuscript to use, wherein the author uses the first communications device to transfer a copy of the reference material and reference material availability information to the communications network, wherein the author lists in the manuscript a distinctive key associated with both the copy of the reference material and the reference material availability information;

a second communications device connected to the communications network for an audience of the manuscript to use, wherein the audience uses the second communications device to request and receive a copy of the reference material and the reference material availability information from the communications network; and a database connected to the communications network to communicate with the author and the audience via the communications network, wherein the database receives a copy of the reference material and the reference material availability information from the author, wherein the database stores an immutable copy of the reference material and the reference material availability information and the distinctive key associated with the copy of the reference material and the reference material availability information;

wherein, if the reference material is available, the database transmits a copy of the reference material to the audience in response to receiving a request having the distinctive key from the audience for a copy of the reference material;

wherein, if the reference material is not available, the database transmits a copy of the reference material availability information to the audience in response to receiving a request having the distinctive key from the audience for a copy of the reference material.

18. A system for archiving a web site cited in a manuscript by an author of the manuscript, the system comprising:

a database connected to the world wide web;

a first communications device connected to the world wide web, wherein an author of a manuscript uses a web site on the web as a reference for the manuscript, wherein the author uses the first communications device to transfer identification of the web site to the database;

wherein the database obtains a copy of the web site from the web upon receiving the web site identification from the author such that the copy of the web site obtained by the database is verbatim to the web site as on the web at the time the author transmitted the web site identification to the database, wherein the database associates a distinctive key with the copy of the web site, stores the copy of the web site along with the distinctive key, and transmits the distinctive key to the author via the web and the first communications device;

wherein the author cites the web site as being a reference for the manuscript by listing the web site identification along with the distinctive key in the manuscript, wherein an audience of the manuscript obtains the distinctive key from the manuscript; and a second communications device connected to the web, wherein the audience uses the second communications device to transmit the distinctive key to the database in order to request the database for the copy of the web site;

wherein the database transfers a copy of the stored copy of the web site to the audience via the web and the second communications device in response to receiving the distinctive key from the audience such that the copy of the web site received by the audience is verbatim to the web site as on the web at the time the author transferred the web site identification to the database.

19. A method for archiving a web site cited in a manuscript by an author of the manuscript, the method comprising:

transferring identification of a web site, cited by an author of a manuscript as a reference for the manuscript, to a database connected to the world wide web;

transferring a copy of the web site from the web to the database in response to the database receiving the web site identification such that the copy of the web site transferred to the database is verbatim to the web site as on the web at the time the web site identification was transferred to the database;

associating a unique key with the copy of the web site;

storing the copy of the web site with the unique key in the database;

the author citing the web site as being a reference for the manuscript by listing the unique key in the manuscript;

an audience of the manuscript obtaining the unique key from the manuscript;

the audience transmitting the unique key to the database in order to request the database for the copy of the web site; and transferring a copy of the stored copy of the web site from the database to the audience via the web in response to the database receiving the unique key from the audience.

20. The method of claim 19 wherein:
associating the unique key with the copy of the web site is done by the author.

21. The method of claim 19 wherein:
associating the unique key with the copy of the web site is done by the database.

22. The method of claim 19 wherein:
storing the copy of the web site with the unique key in the database includes storing the web site identification, the copy of the web site, and the unique key.

23. A method for archiving information cited in a manuscript, the method comprising:

citing a web site in a manuscript;

prior to any modifications to the web site after the web site has been cited in the manuscript, transferring a web site address to a database via the Internet, wherein the web site address identifies the address of the web site on the Internet;

providing a copy of the web site from the Internet to the database in response to the web site address being transferred to the database such that the copy of the web site provided to the database is verbatim to the web site as on the Internet at the time the web site was cited in the manuscript;

assigning a unique key to the copy of the web site;

storing the copy of the web site with the unique key in the database;

wherein citing the web site in the manuscript includes listing the unique key in the manuscript;

an audience of the manuscript obtaining the unique key from the manuscript; and transferring a copy of the stored copy of the web site from the database to the audience via the Internet in response to a request containing the unique key from the audience for a copy of the web site such that the copy of the web site transferred to the audience is verbatim to the web site as on the Internet at the time the web site was cited in the manuscript.

24. The method of claim 23 further comprising:
accessing the Internet to locate the web site prior to citing the web site in the manuscript.

25. The method of claim 24 wherein:
assigning the unique key with the copy of the web site is done by the database.

26. The method of claim 25 further comprising:
transferring the unique key from the database to an author of the manuscript via the Internet, wherein listing the unique key in the manuscript is done by the author.

27. The method of claim 26 wherein:
citing the web site in the manuscript includes the author listing the web site address, the unique key, and the time at which the web site was accessed in the manuscript.

28. The method of claim 23 wherein:
the audience transfers the unique key to the database via the Internet.

* * * * *